US009225699B2

(12) United States Patent
Biradar et al.

(10) Patent No.: US 9,225,699 B2
(45) Date of Patent: Dec. 29, 2015

(54) SECURITY KEY GENERATION IN LINK AGGREGATION GROUP TOPOLOGIES

(71) Applicants: Sudhakar Biradar, Bangalore (IN); Deepak Ramesh, Bangalore (IN)

(72) Inventors: Sudhakar Biradar, Bangalore (IN); Deepak Ramesh, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 559 days.

(21) Appl. No.: 13/631,983

(22) Filed: Sep. 29, 2012

(65) Prior Publication Data

US 2014/0093072 A1     Apr. 3, 2014

(51) Int. Cl.
*H04L 9/32*     (2006.01)
*H04L 29/06*     (2006.01)

(52) U.S. Cl.
CPC .............. *H04L 63/08* (2013.01); *H04L 63/068* (2013.01)

(58) Field of Classification Search
USPC ........................................................ 713/168
See application file for complete search history.

(56) References Cited

PUBLICATIONS

Identity-Based Networking Services: MAC Security Deployment Guide; May 2011; Cisco; 32 pages.*
IEEE Standard for Local and Metropolitan area networks—Link Aggregation; Nov. 2008; 145 pages.*

* cited by examiner

*Primary Examiner* — Christopher Brown

(57) ABSTRACT

A method, system and computer readable medium for security key generation in link aggregation group topologies. The method can include performing, using one or more processors, authentication on each port of a plurality of ports in a link aggregation group. The method can also include deriving, using the one or more processors, a connectivity association key for the link aggregation group. The method can further include computing, using the one or more processors, a security association key for each port in the plurality of ports, the security association key being based on the connectivity association key for the link aggregation group.

20 Claims, 2 Drawing Sheets

SECURITY KEY GENERATION IN LINK AGGREGATION GROUP TOPOLOGIES

TECHNICAL FIELD

Embodiments relate generally to network security, and more particularly, to methods, systems and computer readable media for security key generation in link aggregation group topologies.

BACKGROUND

Media Access Control Security (or MACsec) can provide secure communications on wired Local Area Networks (LANs). When MACsec is used to secure the communications between endpoints on a LAN, each packet on the wire may be encrypted using a symmetric cryptographic key so that communications cannot be monitored or altered. MACsec can provide data origin authentication, integrity protection, anti-replay protection and optional confidentiality of the data.

In some network security standards, for example, the IEEE 802.1x-2010 standard for MACsec in a Link Aggregation Group (LAG) scenario the Connectivity Association Keys (CAKs) may be derived on per port basis. This can lead to a number of CAKs equal to the number of member ports, which can be up to 16 CAKs per LAG.

Maintaining as many CAKs as ports in LAG can contribute to overhead on a control plane, as deriving and maintaining a CAK can be a CPU intensive process. Maintaining a CAK cache for a large number of CAKs can be a tedious task.

MACsec can be used in conjunction with 802.x-2010, which can provide EAP authentication and authorization, and a key derivation mechanism. A Connectivity Association Key (CAK) is the root key used in MACsec, which is derived using a Key Derivation Function (KDF) with a Master Session Key (MSK) provided by a server and MAC addresses of the link. A Security Association Key (SAK) is a symmetric key used for encryption/decryption of the data traffic being carried on the link. The SAK can be derived by the key server using a KDF with CAK, label, member Identifier (MI) and key length as input parameters.

SUMMARY

One or more embodiments can include a method for security key generation in link aggregation group topologies. The method can include performing, using one or more processors, authentication on each port of a plurality of ports in a link aggregation group. The method can also include deriving, using the one or more processors, a connectivity association key for the link aggregation group. The method can further include computing, using the one or more processors, a security association key for each port in the plurality of ports, the security association key being based on the connectivity association key for the link aggregation group.

The deriving can include performing a key derivation function. The key derivation function can receive information including a master session key and a plurality of link aggregation group media access control addresses and derive the connectivity association key based on the received information.

The computing can include performing a key derivation function. The key derivation function can receive information including a link aggregation group connectivity association key, a label, a member identifier and a key length and compute the security association key based on the received information.

The method can further include re-authenticating at a predetermined time interval. The re-authenticating can include repeating the performing, deriving and computing.

One or more embodiments can include a system having one or more processors coupled to a nontransitory computer readable medium having stored thereon software instructions that, when executed by the one or more processors, cause the one or more processors to perform a series of operations.

The operations can include performing authentication on each port of a plurality of ports in a link aggregation group. The operations can also include deriving a connectivity association key for the link aggregation group. The operations can further include computing a security association key for each port in the plurality of ports, the security association key being based on the connectivity association key for the link aggregation group.

The deriving can include performing a key derivation function. The key derivation function can receive information including a master session key and a plurality of link aggregation group media access control addresses and derive the connectivity association key based on the received information.

The computing can include performing a key derivation function. The key derivation function can receive information including a link aggregation group connectivity association key, a label, a member identifier and a key length and compute the security association key based on the received information.

The operations can further include re-authenticating at a predetermined time interval. The re-authenticating can include repeating the performing, deriving and computing.

One or more embodiments can include a nontransitory computer readable medium having stored thereon software instructions that, when executed by a processor, cause the processor to perform a series of operations.

The operations can include performing authentication on each port of a plurality of ports in a link aggregation group. The operations can also include deriving a connectivity association key for the link aggregation group. The operations can further include computing a security association key for each port in the plurality of ports, the security association key being based on the connectivity association key for the link aggregation group.

The deriving can include performing a key derivation function. The key derivation function can receive information including a master session key and a plurality of link aggregation group media access control addresses and derive the connectivity association key based on the received information.

The computing can include performing a key derivation function. The key derivation function can receive information including a link aggregation group connectivity association key, a label, a member identifier and a key length and compute the security association key based on the received information.

The operations can further include re-authenticating at a predetermined time interval. The re-authenticating can include repeating the performing, deriving and computing.

DETAILED DESCRIPTION

In general, an embodiment can include a method, system or computer readable medium for performing an Extensible Authentication Protocol (EAP) process on a per port basis on each of the ports of the LAG. A single CAK can be derived on the LAG using the LAG's MAC address instead of as a per port basis CAK using a per port MAC address.

A per port SAK can be derived using the LAG's CAK. By deriving a per port SAK using the common LAG's CAK, the MI field and the label field can be used. The label field can be a pseudo-random number generated on per port basis. Deriving a per port SAK can help ensure that unique encryption/decryption keys are derived with common LAG's CAK.

Figure 1:
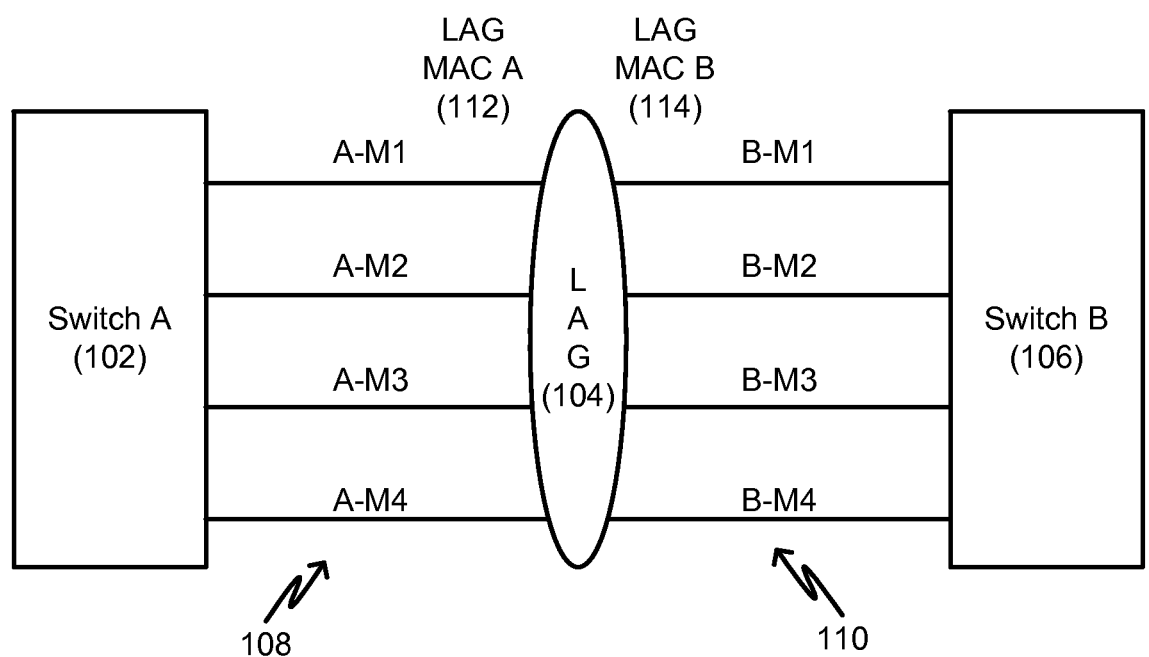
FIG. 1 is a diagram of an example network link aggregation group in accordance with at least one embodiment.

As shown in FIG. 1, a link aggregation group topology network 100 includes a first switch 102, a link aggregation group 104, a second switch 106, first ports 108 and second ports 110.

Figure 2:
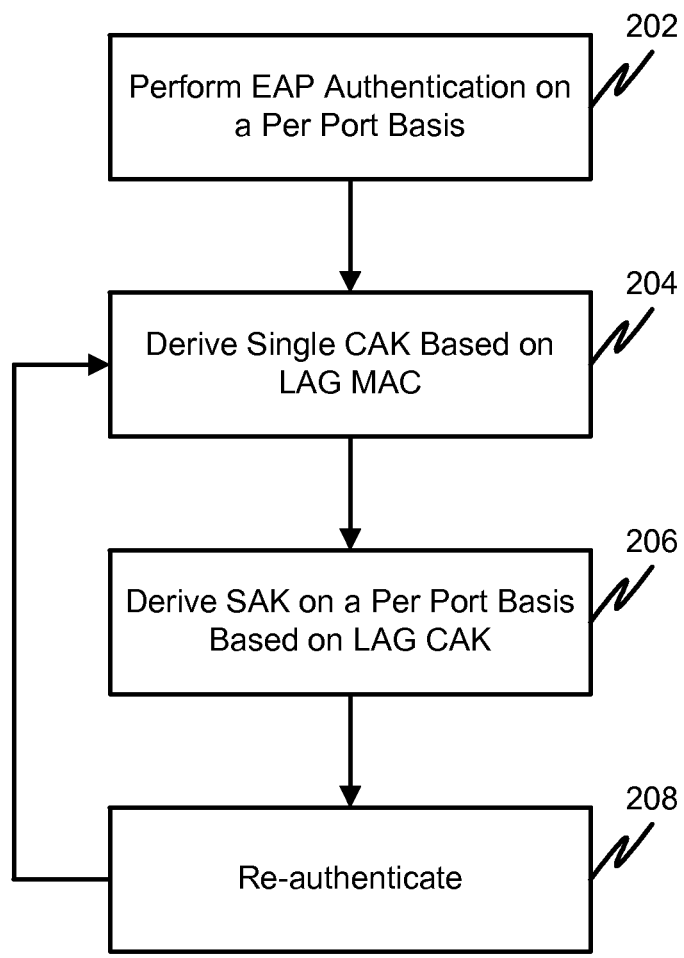
FIG. 2 is a flow chart showing an example method for security key generation in link aggregation group topologies in accordance with at least one embodiment.

FIG. 2 is a flowchart of an example method for security key generation in link aggregation group topologies. For purposes of illustrating example systems and structural elements, FIG. 1 can serve as a reference for the description below regarding FIG. 2.

As shown in FIG. 2, processing beings at 202, where an authentication protocol (e.g., extensible authentication protocol (EAP)) is performed on a per port basis. Processing continues to 204.

At 204, a single CAK is derived for the LAG. For example, a single CAK is derived for the LAG 104 using a key derivation function which receives a master session key, a MAC address for a first switch LAG MAC A 112 (e.g., the MAC of the 108 side of the LAG 104), and a MAC address for a second switch LAG MAC B 114 (e.g., the MAC of the 110 side of the LAG 104). The LAG MACs correspond to switches and LAGs. The LAG MAC used to derive the CAK corresponds to a particular LAG of a switch and a switch can have multiple LAGs. Processing continues to 206.

At 206, a security association key is computed for each port based in part on the LAG CAK derived in 204. For example, a SAK can be computed for each port, where the SAK is based on the LAG CAK, a label, a member identifier and a length. Processing continues to 208.

At 208, a re-authentication optionally occurs. The re-authentication can occur at predetermined time intervals (e.g., every 60 minutes). The re-authentication can include performing 204 and 206 again.

It will be appreciated that 202-208 can be repeated in whole or in part.

It will be appreciated that the modules, processes, systems, and sections described above can be implemented in hardware, hardware programmed by software, software instructions stored on a nontransitory computer readable medium or a combination of the above. A system for security key generation in link aggregation group topologies, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for security key generation in link aggregation group topologies.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for security key generation in link aggregation group topologies, the method comprising:
    performing, using one or more processors, authentication on each port of a plurality of ports in a link aggregation group;
    deriving, using the one or more processors, a connectivity association key for the link aggregation group on a per link aggregation group basis; and
    computing, using the one or more processors, a security association key for each port in the plurality of ports, the security association key being based on the connectivity association key for the link aggregation group.

2. The method of claim 1, wherein the deriving includes performing a key derivation function.

3. The method of claim 2, wherein the key derivation function receives a master session key and a plurality of link aggregation group media access control addresses.

4. The method of claim 1, wherein the computing includes performing a key derivation function.

5. The method of claim 4, wherein the key derivation function receives a link aggregation group connectivity association key, a label, a member identifier and a key length.

6. The method of claim 1, further comprising re-authenticating at a predetermined time interval, wherein the re-authenticating includes repeating the performing, deriving and computing.

7. A system comprising:
    one or more processors coupled to a nontransitory computer readable medium having stored thereon software instructions that, when executed by the one or more processors, cause the one or more processors to perform a series of operations, the series of operations including:
        performing authentication on each port of a plurality of ports in a link aggregation group;
        deriving a connectivity association key for the link aggregation group; and
        computing a security association key for each port in the plurality of ports, the security association key being based on the connectivity association key for the link aggregation group.

8. The system of claim 7, wherein the deriving includes performing a key derivation function.

9. The system of claim 8, wherein the key derivation function receives a master session key and a plurality of link aggregation group media access control addresses.

10. The system of claim 7, wherein the computing includes performing a key derivation function.

11. The system of claim 10, wherein the key derivation function receives a link aggregation group connectivity association key, a label, a member identifier and a key length.

12. The system of claim 7, wherein the operations further include re-authenticating at a predetermined time interval, and wherein the re-authenticating includes repeating the performing, deriving and computing.

13. A nontransitory computer readable medium having stored thereon software instructions that, when executed by a processor, cause the processor to perform a series of operations comprising:
    performing authentication on each port of a plurality of ports in a link aggregation group;
    deriving a connectivity association key for the link aggregation group; and
    computing a security association key for each port in the plurality of ports, the security association key being based on the connectivity association key for the link aggregation group.

14. The nontransitory computer readable medium of claim 13, wherein the deriving includes performing a key derivation function.

15. The nontransitory computer readable medium of claim 14, wherein the key derivation function receives a master session key and a plurality of link aggregation group media access control addresses.

16. The nontransitory computer readable medium of claim 13, wherein the computing includes performing a key derivation function.

17. The nontransitory computer readable medium of claim 16, wherein the key derivation function receives a link aggregation group connectivity association key, a label, a member identifier and a key length.

18. The nontransitory computer readable medium of claim 13, wherein the operations further include re-authenticating at a predetermined time interval.

19. The nontransitory computer readable medium of claim 18, wherein the re-authenticating includes repeating the performing, deriving and computing.

20. The nontransitory computer readable medium of claim 13, wherein the operations further include deriving a connectivity association key for each of a plurality of link aggregation groups on a single switch, each connectivity association key being derived on a per link aggregation group basis.

* * * * *